July 12, 1955

D. J. BRACCO ET AL 2,712,751

METHOD OF TESTING THE WET STRENGTH OF
A LIQUID-SETTLED SCREEN

Filed Jan. 2, 1951

INVENTOR
DONATO J. BRACCO
WILLIAM R. WATSON
BY
ATTORNEY

United States Patent Office 2,712,751
Patented July 12, 1955

2,712,751

METHOD OF TESTING THE WET STRENGTH OF A LIQUID-SETTLED SCREEN

Donato J. Bracco and William R. Watson, Bayside, N. Y., assignors to Sylvania Electric Products Inc., a corporation of Massachusetts Application January 2, 1951, Serial No. 204,012

3 Claims. (Cl. 73—7)

This invention relates to a method for testing the wet strength of a thin layer of settled particles. More particularly, it relates to a method for testing the wet strength of liquid settled cathode ray tube screens.

One of the crucial steps in the preparation of cathode ray tube screens by the liquid settling process is the decantation of the supernatent liquid after the phosphor has been deposited. The success of this step depends on the absence of vibration, jarring during decantation and on the wet strength of the deposit. Heretofore, no satisfactory method other than that of trial and error had been developed to measure such wet strength.

It is, therefore, an object of this invention to provide a method for the measurement of wet strength of settled screens which will enable an operator not only to forecast whether or not the screen will have sufficient wet strength to permit decantation but will also provide a method of comparing the wet strengths of screens deposited from different media.

It is a further object of this invention to provide a simple method by means of which the wet strength of screens at various stages of the settling operation can be measured.

It is a still further object of this invention to provide a method by means of which it is possible to obtain values which are comparable with values obtained by testing other screens.

It has been found that these and other advantages can be obtained by means of an erosion test carried out with an apparatus adapted to test different parts of the same screen at intervals during the settling operation.

Figure 1:
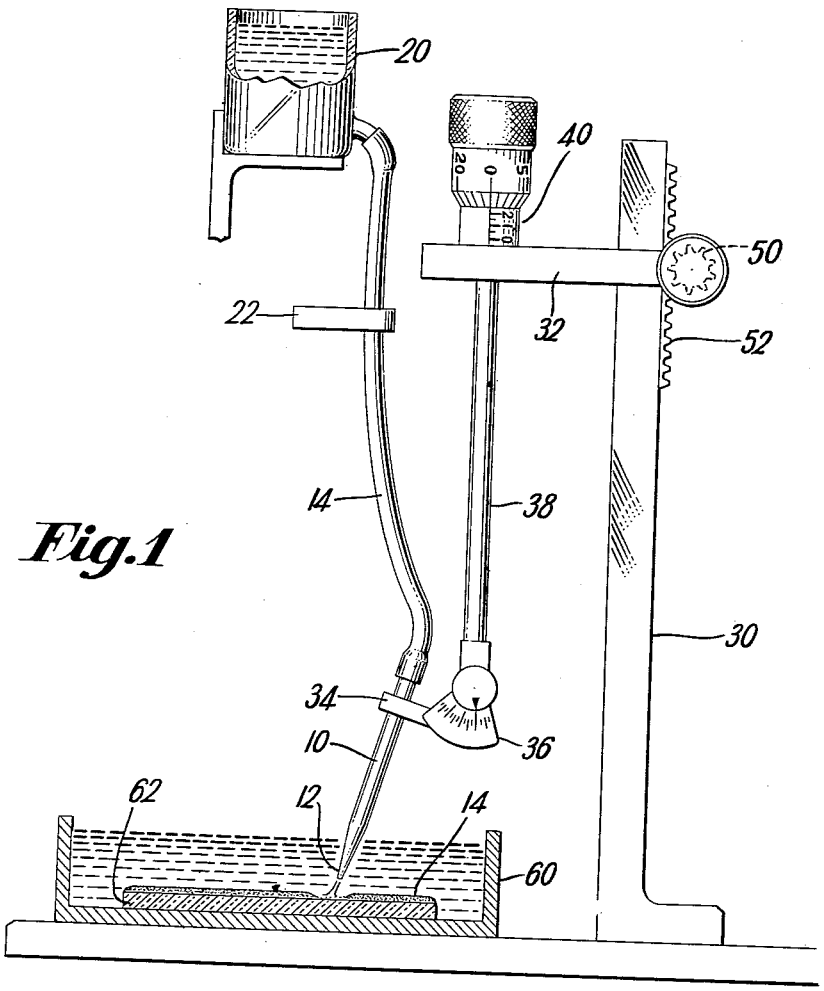

In the accompanying drawings which illustrate a preferred form of apparatus for practicing the method of the present invention Figure 1 is a side elevation partly in section showing a submerged hydraulic jet, a reservoir for the fluid, a means for measuring the height of the hydraulic jet above the screen, a receptacle holding the settling solution, and a plaque upon which a screen is being settled.

Figure 2:
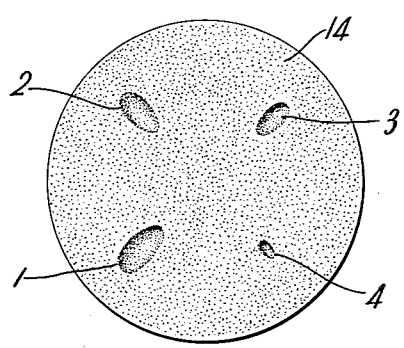

Figure 2 is a plan view of a tested plaque.

The erosion tester consists in general of a tube 10 provided with a nozzle 12 connected to a reservoir 20 for a liquid through a hose 14, the tube 10 being connected to a stand 30 by means of an arm 32 which is adapted to hold the tube in various positions with respect to the screen which is to be tested for wet strength. In the preferred apparatus shown in the drawing the nozzle 12 has an orifice having a diameter of approximately 0.062 centimeter. This figure is significant only to the extent that it gives a value that can be used to obtain optimum results. It has been found that with a nozzle having this diameter the height of the reservoir to the tip of the nozzle may be kept at approximately 100 centimeters. For optimum results using diameters and figures as given above it has been found that the tip of the nozzle should be kept at about 1 centimeter from the settled powder deposit. The angle of inclination of the nozzle with respect to the screen is shown in the drawing as about 75° to the settled powder. This angle of inclination of the nozzle could, however, readily be changed to 90°. These figures as given above are only important to the extent that if comparative results are to be obtained the same figure should be used for each of them in comparative tests. A pinch clamp 22 is provided on the rubber hose in order to make it possible to turn the flow of water on and off. The reservoir is so constructed and positioned above the settling solution that it maintains a constant head over the nozzle. In the apparatus shown in the drawing the arm 32 to which the nozzle 10 is connected to the stand 30 through a linking arm 34 provided with a scale 36 for measuring the angle of inclination of the nozzle is attached to a rod 38 which is in turn connected to a micrometer barrel 40 mounted on arm 32. By this means it is possible to measure and control the distance between the orifice and the screen. The pinion 50 and rack 52 mechanism provided on arm 32 and stand 30 permits of the rough setting of the distance.

The settling operation may be carried out in a dish 60 containing a glass disc or plaque 62 upon which the phosphor particles settle to form a screen 64.

The test is carried out by setting the dish 60 on the stand placing the glass disc 62 within the dish and then placing the erosion tester into position over the disc and lowering the nozzle 10 whose angle of inclination has been adjusted to that desired, until it just makes contact with the disc whereupon the nozzle is raised by means of the micrometer adjustment to the required height approximately 1 centimeter. The apparatus is then ready for the test. The phosphor suspension is mixed with the constituents of the settling medium and poured over the panel in the settling tank. After a given time measured from the start of the mixing of the constituents of the settling medium the pinch clamp is opened for approximately five seconds and then closed. The flow of fluid through the tube and out through the orifice against the settled phosphor produces an egg-shaped eroded spot such as is shown in Figure 2 of the drawing when the nozzle is held at an angle of about 75°. If the nozzle is held at 90° this eroded spot is circular in nature. After producing the spot the size is measured and the tank or dish turned or rotated to bring an area of undisturbed deposit under the nozzle whereupon the test is repeated at suitable intervals. Figure 2 of the drawing shows the various sizes of the eroded spot so obtained during four different stages of the settling operation. As can readily be seen, the first spot indicated by numeral 1 in Figure 2 on the drawings obtained at an early stage is quite large, the second indicated by numeral 2 is somewhat reduced and the third indicated by numeral 3 is approximately or less than half of the spot originally produced whereas the fourth indicated by numeral 4 is very small indeed. Comparative results can be obtained by measuring the size of each of the spots.

While the above description and the drawings submitted herewith disclose a preferred method for testing wet strength according to the present invention it will be understood by those skilled in the art that the specific details of the method described are by way of illustration and are not to be construed as limiting the scope of the invention.

What is claimed is:

1. The method of testing the wet strength of a liquid-settled screen during the settling operation including the steps of immersing a plaque in a liquid settling solution containing luminescent particles such that luminescent particles settle out of said solution onto said plaque as a coating, directing a flow of fluid at controlled velocities at different portions of said coating while immersed in said solution and at controlled intervals to erode areas of said coating, and measuring the eroded areas so produced.

2. The method of testing the wet strength of a liquid-settled screen during the settling operation including the steps of immersing a horizontally-extending plaque in a liquid settling solution containing luminescent particles such that luminescent particles settle out of said solution onto said plaque as a coating, adjusting the spacing and inclination of a nozzle in relation to said horizontally-extending plaque, directing a flow of fluid from said nozzle at different portions of said coating while immersed in said solution and at controlled velocities and intervals to erode areas of said coating, and measuring the eroded areas so produced.

3. The method of testing the wet strength of a liquid-settled screen during the settling operation including the steps of immersing a plaque in a liquid settling solution containing luminescent particles such that luminescent particles settle out of said solution onto said plaque as a coating, adjusting the spacing of a nozzle in relation to said plaque, directing a flow of fluid from said nozzle at different portions of said coating while immersed in said solution and at controlled velocities and intervals to erode areas of said coating, and measuring the eroded areas so produced.

References Cited in the file of this patent

UNITED STATES PATENTS

| 2,032,856 | Steiner | Mar. 3, 1936 |
| 2,096,416 | Weinhart | Oct. 19, 1937 |
| 2,412,654 | Sadowsky | Dec. 17, 1946 |

FOREIGN PATENTS

| 476,876 | Great Britain | Dec. 13, 1937 |

OTHER REFERENCES

Scientific American, p. 149, March 1934.
Automotive Industries, p. 762, December 7, 1935.